United States Patent [19]
Yamaguchi et al.

[11] Patent Number: 5,183,849
[45] Date of Patent: Feb. 2, 1993

[54] POLYPHENYLENE ETHER COMPOSITION

[75] Inventors: Soichiro Yamaguchi; Koichi Matsuda; Hideo Goto, all of Yamaguchi, Japan

[73] Assignee: Ube Cycon, Ltd., Tokyo, Japan

[21] Appl. No.: 717,479

[22] Filed: Jun. 19, 1991

[30] Foreign Application Priority Data

Jul. 10, 1990 [JP] Japan .................................. 2-182248

[51] Int. Cl.⁵ ........................ C08L 71/12; C08L 91/06
[52] U.S. Cl. ...................................... 525/68; 524/275; 524/487; 525/905
[58] Field of Search ................... 525/68, 905; 524/275, 524/487

[56] References Cited

U.S. PATENT DOCUMENTS

| | | | |
|---|---|---|---|
| 3,981,841 | 9/1976 | Abolins et al. | 525/71 |
| 4,659,760 | 4/1987 | van der Meer | 524/487 |
| 4,659,790 | 4/1987 | Shimozato et al. | 525/70 |

FOREIGN PATENT DOCUMENTS

| | | |
|---|---|---|
| 0976689 | 10/1975 | Canada ..................... 525/68 |
| 3116491 | 11/1982 | Fed. Rep. of Germany . |
| 3530304 | 2/1987 | Fed. Rep. of Germany . |
| 47-43174 | 10/1972 | Japan . |
| 47-43290 | 11/1972 | Japan . |
| 1312465 | 4/1973 | United Kingdom . |

*Primary Examiner*—James J. Seidleck
*Assistant Examiner*—Thomas Hamilton, III
*Attorney, Agent, or Firm*—Kanesaka and Takeuchi

[57] ABSTRACT

A polyphenylene ether composition excelling in heat-proofness, shock resistance, weatherability, gloss, chemical resistance, and moldability comprises 100 parts by weight of a mixture of the following components (a) and (b) and from 0.1 to 10.0 parts by weight of an acid-modified wax (c):

(a) polyphenylene ether or the combination of polyphenylene ether and an aromatic vinyl polymer and
(b) a graft copolymer obtained by emulsion polymerizing 20 to 90 parts by weight of an aromatic vinyl compound to 10 to 80 parts by weight (as reduced to rubber content) of an ethylene-propylene-nonconjugate diene copolymer rubber latex having a gel content of from 40 to 95% by weight and an average dispersed rubber particle diameter of from 0.2 to 1.0 $\mu m$ by the use of a redox initiator composed of cumene hydroperoxide, ferrous sulfate, sodium pyrophosphate, and dextrose.

7 Claims, No Drawings

POLYPHENYLENE ETHER COMPOSITION

BACKGROUND OF THE INVENTION

1. Field of the Invention

This invention relates to a polyphenylene ether composition and more particularly to a polyphenylene ether composition which excels in gloss, chemical resistance, and moldability as well as in heatproofness, shock resistance, and weatherability.

2. Description of the Prior Art

The polyphenylene ether is a resin which excels in heat-proofness, chemical resistance, and mechanical and electrical properties. It nevertheless is deficient in moldability and shock resistance. Various improvements have been tried for the purpose of eliminating these drawbacks. For example, a method which resides in incorporating in the polyphenylene ether an aromatic vinyl polymer manifesting compatibility therewith has been proposed for the improvement of moldability and a method which consists in incorporating rubber in the polyphenylene ether has been offered for the improvement of shock resistance. Particularly, the incorporation of an aromatic vinyl polymer modified with rubber in the polyphenylene ether proves to be particularly advantageous, and it simultaneously improves moldability and shock resistance. The aromatic vinyl polymer modified with rubber generally contains a diene type rubber as a rubber component and, therefore, entails a problematic drawback that it quickly develops fragility on exposure to elevated temperatures or on exposure to outdoor conditions for a long time. The improvement directed to overcoming this drawback by using a copolymer produced by graft polymerizing an aromatic vinyl monomer to an ethylene-α-olefin-polyene terpolymer rubber has been proposed in Japanese Patent Publications SHO 47(1972)-43,174 and SHO 47(1972)-43,290.

Heretofore, for the production of an ethylene-α-olefin-polyene terpolymer such as, for example, the graft copolymer of an aromatic vinyl compound with an ethylene-propylene-nonconjugate diene copolymer, the method which comprises graft copolymerizing styrene, for example, by suspension polymerization, solution polymerization, or bulk polymerization, to an ethylene-propylene-nonconjugate diene copolymer has been known to the art. From the viewpoint of stability of the reaction system during the polymerization, physical properties of the produced graft copolymer, and economy of the production itself, the graft copolymerization by the process of solution polymerization predominates today.

The composition which incorporates therein the copolymer resulting from the graft polymerization of an aromatic vinyl monomer to an ethylene-α-olefin-polyene terpolymer rubber proposed in Japanese Patent Publications SHO 47(1972)-43,174 and SHO 47(1972)-43,290, however, has the disadvantage that it is inferior in gloss and chemical resistance to the system containing diene rubber.

When the graft copolymer of an ethylene-propylene-nonconjugate diene copolymer with an aromatic vinyl compound is produced by the process of solution polymerization, the produced copolymer is prevented from containing an ethylene-propylene-nonconjugate diene copolymer rubber in a high concentration and acquiring well-balanced physical properties on account of the form of polymerization. The composition to be obtained by combining the copolymer of this nature with polyphenylene ether, therefore, entails the disadvantage that it is inevitably deficient in physical properties.

SUMMARY OF THE INVENTION

This invention aims to provide a high-quality polyphenylene ether composition which prevents the problems of the prior art described above and excels in gloss, chemical resistance, and moldability as well as in heatproofness, shock resistance, and weatherability.

To be specific, the polyphenylene ether composition of this invention is characterized by containing (c) 0.1 to 10.0 parts by weight of an acid-modified wax in 100 parts by weight of a mixture of (a) polyphenylene ether or the combination of polyphenylene ether with an aromatic vinyl polymer with (b) a graft copolymer obtained by adding 20 to 90 parts by weight of an aromatic vinyl compound to 10 to 80 parts by weight (as reduced to rubber content) of an ethylene-propylene-nonconjugate diene copolymer rubber latex having a gel content of from 40 to 95% by weight and an average dispersed rubber particle diameter of from 0.2 to 1.0 μm thereby preparing a total of 100 parts by weight of a monomer mixture and emulsion polymerizing the monomer mixture by the use of a redox initiator composed of cumene hydroperoxide, ferrous sulfate, sodium pyrophosphate, and dextrose.

In accordance with this invention, a high-quality polyphenylene ether composition is offered which excels invariably in heatproofness, shock resistance, weatherability, gloss, chemical resistance, and moldability.

DESCRIPTION OF THE PREFERRED EMBODIMENTS

The present inventors have continued a diligent study with a view to solving the problems of the prior art, to find that a polyphenylene ether composition which is produced by emulsion graft copolymerizing a prescribed amount of an aromatic vinyl compound to an ethylene-propylene-nonconjugate diene copolymer rubber having a high gel content by the use of a prescribed redox initiator, mixing the resultant graft copolymer with polyphenylene ether or a mixture of polyphenylene ether with an aromatic vinyl polymer, and further adding an acid-modified wax to the resultant mixture excels in heatproofness, shock resistance, and weatherability, exhibits dramatically improved gloss, and acquires unforeseeable improvements in chemical resistance and moldability. This invention has been perfected as a result.

Now, this invention will be described in detail below.

The polyphenylene ether to be used as the component (a) in this invention is a polymer possessing a structural unit represented by the following general formula [I]:

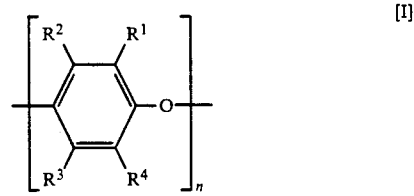

or a copolymer composed of two or more structural units of the general formula [I] selected within a range short of practically impairing the fundamental properties of polyphenylene ether, i.e. heatproofness and mechanical properties, on the condition that the subscript "n" in the general formula is an integer exceeding 50. The substituents, $R^1$, $R^2$, $R^3$, and $R^4$, are independently one member selected from the class consisting of hydrogen atom, halogen atoms, hydrocarbon groups, substituted hydrocarbon groups, hydrocarbon oxy groups, and substituted hydrocarbon oxy groups. The concrete examples of $R^1$, $R^2$, $R^3$, and $R^4$ include hydrogen atom; halogen atoms such as chlorine, bromine, and iodine; hydrocarbon groups such as methyl, ethyl, propyl, isopropyl, butyl, t-butyl, allyl, phenyl, and methyl benzyl, and substituted hydrocarbon groups such as chloromethyl and bromomethyl; and hydrocarbon oxy groups such as methoxy, ethoxy, phenoxy, and chloroethoxy and substituted hydrocarbon oxy groups, for example. Specifically, the polyphenylene ethers which are effectively usable as the component (a) herein include polymers such as poly-2,6-dimethyl-1,4-phenylene oxide, poly-2,6-diethyl-1,4-phenylene oxide, poly-2,6-dipropyl-1,4-phenylene oxide, poly-2-methyl-6-isopropyl-1,4-phenylene oxide, poly-2,6-dimethoxy-1,4-phenylene oxide, poly-2,6-diphenyl-1,4-phenylene oxide, poly-2,6-dichloro-1,4-phenylene oxide, and poly-2,5-dimethyl-1,4-phenylene oxide and copolymers such as copolymer of 2,6-dimethyl phenol with 2,3,6-trimethyl phenol and copolymer of 2,6-dimethyl phenol with 3-methyl-6-t-butyl phenol, for example.

The polyphenylene ether of this invention may contain a modification product of the aforementioned polymer or copolymer. The modification products which are usable herein include what is produced by oxidation polymerizing a compound represented by the following general formula [II] in the presence of an ethylene-propylene-polyene terpolymer or in the presence of polystyrene, what is obtained by polymerizing styrene in the presence of a polyphenylene oxide polymer or copolymer, and what is obtained by kneading a polyphenylene oxide polymer or copolymer and styrene in combination with a peroxide in an extruding device until reaction, for example.

$$[II]$$

(wherein $R^1$, $R^2$, $R^3$, and $R^4$ have the same meanings as defined above).

The component (a) of this invention, as described above, embraces the combination of polyphenylene ether with an aromatic vinyl polymer. The term "aromatic vinyl polymer" as used herein refers to a polymer containing not less than 50% by weight of an aromatic vinyl monomer represented by the following general formula [III]:

$$[III]$$

(wherein, $R^a$, $R^b$, $R^c$, $R^d$, and $R^e$ are independently a hydrogen atom, a halogen atom, a hydrocarbon group or a substituted hydrocarbon group, or a hydrocarbon oxy group or a substituted hydrocarbon oxy group and $R^f$ is a hydrogen atom or a lower alkyl group of 1 to 4 carbon atoms).

Concrete examples of the substituents, $R^a$ to $R^e$, in the aforementioned general formula [III] include hydrogen atom; halogen atoms such as chlorine and iodine; hydrocarbon groups such as methyl, ethyl, propyl, vinyl, allyl, benzyl, and methyl benzyl; substituted hydrocarbon groups such as chloromethyl and bromomethyl; and hydrocarbon oxy groups such as methoxy, ethoxy, phenoxy, and monochloromethoxy and substituted hydrocarbon oxy groups. Concrete examples of the substituent $R^f$ include hydrogen atom and lower alkyl groups such as methyl and ethyl.

The polymers and copolymers of the aforementioned aromatic vinyl monomer which are usable herein include polystyrene, polychlorostyrene, poly-α-methyl styrene, styrene-acrylonitrile copolymer, styrene-α-methyl styrene copolymer, styrene-p-methyl styrene copolymer, styrene-maleic anhydride copolymer, and styrene-methyl methacrylate copolymer, for example. Among other polymers and copolymers enumerated above, polystyrene proves to be particularly desirable.

The gel-containing ethylene-propylene-nonconjugate diene copolymer rubber to be used as the component (b) in this invention is a well-known substance and the latex thereof can be obtained by a well-known method. For example, an ethylene-propylene-nonconjugate diene copolymer rubber latex which possesses a gel content and an average dispersed rubber particle diameter both falling in the ranges specified by this invention is obtained by first dissolving an uncrosslinked ethylene-propylene-nonconjugate diene copolymer rubber in a solvent, emulsifying the produced solution, then stripping the resultant emulsion thereby expelling the solvent and forming an emulsified latex, and thereafter polymerizing the emulsified latex by the use of a prescribed amount of a suitable cross-linking agent such as a radical initiator. In this invention, the ethylene-propylene-nonconjugate diene copolymer rubber requires to have a gel content of from 40 to 95% by weight, preferably 50 to 80% by weight, in terms of rubber component insoluble in toluene. If the gel content is less than 40% by weight, the polyphenylene ether composition obtained by mixing the produced graft copolymer with polyphenylene ether or the combination of polyphenylene ether with an aromatic vinyl polymer fails to acquire high shock resistance and gloss. Conversely, if the gel content exceeds 95% by weight, the polyphenylene ether composition is conspicuously deficient in shock resistance. Thus, any deviation of the gel content from the specified range is undesirable.

Further, the ethylene-propylene-nonconjugate diene copolymer rubber in the latex requires to possess an average dispersed particle diameter in the range of from 0.2 to 1.0 μm. If this average particle diameter is larger than 1.0 μm, the produced polyphenylene ether composition is deficient in shock resistance and gloss. If this average particle diameter is smaller than 0.2 μm, the composition is deficient in shock resistance.

The aforementioned ethylene-propylene-nonconjugate diene copolymer rubber is desired to have ethylene and propylene in a gravimetric ratio in the range of 85 : 15 to 30 : 70. The nonconjugate diene component is desired to be 1,4-hexadiene, 5-ethylidene-2-norbornene, 5-vinyl norbornene, or dicyclopenta-diene, for example.

The aromatic vinyl compounds which are usable effectively for graft copolymerization with the ethylene-propylene-nonconjugate diene copolymer rubber in this invention include those aromatic vinyl monomer compounds mentioned above. For example, styrene or α-methyl styrene is used advantageously.

In accordance with this invention, 20 to 90 parts by weight of the aforementioned aromatic vinyl monomer compound is graft polymerized to 10 to 80 parts by weight of the aforementioned gel-containing ethylene-propylene-nonconjugate diene copolymer rubber so as to produce a total of 100 parts by weight of a graft copolymer. In this reaction of graft copolymerization, the produced polyphenylene ether composition is deficient in shock resistance and heatproofness when the amount of the aforementioned copolymer rubber to be used is less than 10 parts by weight and the composition is deficient in balance between shock resistance and moldability when this amount exceeds 80 parts by weight. Thus, any deviation of this amount from the aforementioned range is undesirable.

In this invention, a redox initiator which is composed of cumene hydroperoxide, ferrous sulfate, sodium pyrophosphate, and dextrose is used as a polymerization initiator. Owing to the use of this initiator, the polyphenylene ether composition using the produced graft copolymer is notably improved in shock resistance and gloss.

The acid-modified wax to be used as the component (c) in this invention is a saturated hydrocarbon wax containing a COOH group and/or an acid anhydride and has a structure produced by random copolymerizing a 1-olefin to an unsaturated carboxylic acid or anhydride or a structure produced by grafting an unsaturated carboxylic acid or anhydride to a saturated hydrocarbon wax. The unsaturated carboxylic acids and anhydrides which are effectively usable for the acid-modified wax include acrylic acid, methacrylic acid, maleic acid, fumaric acid, citraconic acid, itaconic acid, and 5-norbornene-2,3-dicarboxylic acid, and anhydrides thereof, for example. This acid-modified wax may be any of commercial products which answer the description given above.

In this invention, the method to be used for the incorporation of the acid-modified wax in the polyphenylene ether composition is not particularly restricted. This incorporation may be made at any time during the emulsification of the ethylene-propylene-nonconjugate diene copolymer rubber, during the graft polymerization of the emulsified copolymer rubber, during the kneading of the resultant latex with the other component, for example. The acid-modified wax as the component (c) is used in an amount falling in the range of 0.1 to 10.0 parts by weight, based on the total of 100 parts by weight of the component (a) and the component (b) of the polyphenylene ether composition. The acid-modified wax manifests virtually no effect in enhancing gloss and moldability when the amount thereof is less than 0.1 part by weight, whereas the produced polyphenylene ether composition is deficient in gloss and in heatproofness and tensile strength as well when the amount of the acid-modified wax exceeds 10 parts by weight.

In this invention, the ratio of the component (a) to the component (b) is desired to be such that the proportion of the component (b) falls in the range of 5 to 100 parts by weight, based on 100 parts by weight of the component (a). The produced polyphenylene ether composition acquires no practically acceptable shock resistance if the proportion of the component (b) is less than 5 parts by weight. If the proportion of the component (b) is more than 100 parts by weight, it suffers from impairment of compatibility with PPE and consequent decline of physical properties or induces degradation of heatproofness due to the proportionate decrease in the amount of the component (a).

The polyphenylene ether composition of this invention, when necessary, may incorporate therein such ordinary additives as antioxidant, flame-retardant, pigment, and ultraviolet absorbent in a combined amount which is short of notably affecting the physical properties of the product to be obtained, in addition to the aforementioned essential components.

The polyphenylene ether composition of this invention can be easily produced by mechanically mixing the components (a), (b), and (c) and various additives optionally added thereto by the use of a mixing device represented by a roll mill, a Banbury mixer, an extruder, or a kneader or mixing them in the form of solution or suspension.

Now, this invention will be described more specifically below with reference to production examples, working examples, and comparative experiments. This invention is not limited in any way to the working examples but may be practised otherwise without departing from the spirit of this invention. Wherever the term "parts" are used hereinafter, it invariably means "parts by weight."

PRODUCTION EXAMPLE 1

Emulsification and Cross-linking of Ethylene-propylene-nonconjugate Diene Copolymer Rubber A solution prepared by dissolving 10 parts of a commercially available ethylene-propylene-ethylidene norbornene terpolymer rubber (produced by Mitsui Petrochemical Industries, Ltd. and marketed under product code of "3045") (hereinafter referred to as "EPDM") in 90 parts of n-hexane and further dissolving therein 2 to 6 parts of oleinic acid was gradually added as stirred for emulsification to a solution obtained in advance by dissolving 0.3 to 0.9 part of potassium hydroxide in 200 parts of water and kept at 60° to 90° C. The resultant mixture was thoroughly emulsified by the use of a colloid mill. Then, the latex consequently obtained was subjected to steam distillation to expel the n-hexane therefrom. The residue of the distillation was further subjected to vacuum distillation to adjust the solids content of the latex to 35% by weight. The consequent product had a prescribed dispersed particle diameter.

Subsequently, an EPDM latex having a prescribed gel content was obtained by adding to the produced latex 2 parts of divinyl benzene and 0 to 2 parts of Perhexa 3M (trademark designation owned by Nippon Oils & Fats Co., Ltd.), both based on 100 parts of the rubber content of the latex and heating the resultant mixture at 130° C. for five hours for reaction. The gel content of the cross-linked latex was determined by solidifying a sample latex with dilute sulfuric acid, washing the solid latex with water, drying the wet solid latex, separating a 1-g specimen of the dried solid latex, keeping this specimen immersed in 200 ml of toluene for 40 hours, separating the impregnated specimen by filtration through a 200-mesh stainless steel net, drying the separated specimen, and weighing the dried specimen.

The EPDM emulsion latexes, A to F, obtained by this experiment were examined as to gel content and average dispersed rubber particle diameter. The results are shown in Table 1.

TABLE 1

| EPDM latex | Gel content (weight %) | Average dispersed rubber particle diameter (μm) | Remark |
| --- | --- | --- | --- |
| A | 45 | 0.55 | Working examples of this invention |
| B | 70 | 0.55 | |
| C | 65 | 0.90 | |
| D | 98 | 0.55 | Comparative experiments |
| E | 0 | 0.55 | |
| F | 63 | 1.80 | |

PRODUCTION EXAMPLE 2

Production of Styrene-grafted EPDM (Emulsion Polymerization)

A varying cross-linked EPDM emulsion latex was subjected to graft polymerization using the following formulation (parts).

| | |
| --- | --- |
| EPDM latex (as solids content) | 60 |
| Styrene | 40 |
| Cumene hydroperoxide | 0.5 |
| Ferrous sulfate | 0.01 |
| Sodium pyrophosphate | 0.5 |
| Dextrose | 0.6 |
| Water | 170 |
| n-dodecyl mercaptan | 0.1 |

The polymerization was carried out in an atmosphere of nitrogen at 60° C. for five hours. The resultant latex was solidified, washed, and dried, to obtain a white powder of styrene-grafted EPDM (emulsion polymerization) (hereinafter referred to briefly as "emulsified ST-EPDM").

PRODUCTION EXAMPLE 3

An emulsified ST-EDPM was obtained by following the procedure of Production Example 2, excepting a thermal initiation type potassium persulfate (PPS) as an initiator.

PRODUCTION EXAMPLE 4

In 92.5 parts of styrene, 7.5 parts of EPDM and 0.1 part of Perhexa 3M were dissolved. The resultant solution was heated as stirred at 110° C. for 0.5 hour to effect polymerization of the monomer components to a low ratio of conversion. The viscous liquid consequently obtained was converted into a suspension by the addition thereto of 200 parts of water, 0.1 part of polyvinyl alcohol, and 1.0 part of Perhexa 3M. This suspension was heated at 130° C. for five hours to continue the polymerization until completion. Thereafter, the resultant polymer was washed with water and dried, to obtain a styrene-grafted EPDM (bulk polymerization) (hereinafter referred to briefly as "bulk ST-EPDM").

PRODUCTION EXAMPLE 5

In 300 parts of toluene and 85 parts of styrene, 15 parts of EPDM was dissolved. The resultant solution and 1.5 parts of Perhexa 3M added thereto were heated in an autoclave at 130° C. for five hours to effect polymerization of the monomer components. The polymer was sedimented in methanol, washed, and dried, to obtain a styrene-grafted EPDM (solution polymerization) (hereinafter referred to briefly as "solution ST-EPDM").

PRODUCTION EXAMPLE 6

A styrene-grafted polybutadiene latex (emulsion polymerization) (hereinafter referred to as "emulsified ST-PBDE") was obtained by following the procedure of Production Example 2, excepting a polybutadiene latex possessing an average particle diameter of 0.35 μm and a gel content of 85% was used in the place of the cross-linked EPDM latex.

EXAMPLE 1

In a 20-mm biaxial extruding device, 25 parts of an emulsified ST-EPDM prepared of the EPDM latex A of Production Example 2, 30 parts of polyphenylene ether of $[\eta]=0.51$ (measured in chloroform at 25° C.) obtained by oxidation polymerization of 2,6-dimethyl phenol, 45 parts of a commercially available polystyrene (produced by Nippon Steel Chemical Co., Ltd. and marketed under product code of "G-20"), and 5 parts of a commercially available acid-modified wax (produced by Mitsui Petrochemical Industries, Ltd. and marketed under trademark designation of "High Wax 2203A") were kneaded. The resultant mixture was injection molded at 280° C. The molded product was evaluated for physical properties by the following methods. The results are shown in Table 2.

Minimum Injection Molding Pressure, SSP (kg/cm$^2$)

The minimum pressure required for packing a sample in a 2-ounce injection molding device at a cylinder temperature of 280° C. was reported as the minimum injection molding pressure.

Shock Resistance, Izod Imp., ⅛', 24° C. (kg.cm/cm)

The method specified in ASTM-D256 (notched) was followed with the necessary modifications.

Heat Distortion Point, H.DT (18.6 kg/cm$^2$") (° C.)

The method specified in ASTM D648-56 was followed with the necessary modifications.

Tensile Strength (kg/cm$^2$)

The method specified in ASTM-D638 was followed with the necessary modifications.

Flexural strength (kg/cm$^2$)

The method specified in ASTM-D790 was followed with the necessary modifications.

Gloss (%)

The method specified in Japanese Industrial Standard (JIS) Z8741 (reflectance of light of incident angle of 60°) was followed with the necessary modifications.

Chemical Resistance

A dumbbell-shaped test piece ⅛ inch in thickness was kept immersed in cyclohexane at normal room temperature for 24 hours. At the end of the immersion, it was weighed to determine the amount of cyclohexane absorbed by the test piece.

The test piece which had undergone the immersion was visually examined as to appearance, with the change of surface condition rated by the four-point scale, wherein:
○: Good appearance
△: Slightly inferior appearance
X : Inferior appearance
XX : Particularly inferior appearance

EXAMPLES 2 TO 5 AND COMPARATIVE EXPERIMENTS 1 TO 11

Molded products were obtained by following the procedure of Example 1, excepting varying materials shown in Table 2 were kneaded in varying ratios shown in Table 2. They were evaluated for physical properties in the same manner as in Example 1. The results are shown in Table 2.

In Table 2, the term "high-impact polystyrene" refers to a high-impact quality polystyrene (produced by Nippon Steel Chemical Co., Ltd. and marketed under product code of "H-63") and the term "ordinary wax" to polyethylene wax (produced by the same company and marketed under trademark designation of "Flosen UF").

Table 2 clearly shows the following facts.

The EPDM latex whose gel content was smaller than the range specified by this invention (Comparative Experiment 1) formed a molded product which was deficient in shock resistance, mechanical properties, gloss, and chemical resistance, whereas the EPDM latex having a larger gel content than the range (Comparative Expeirment 2) formed a molded product which was deficient in shock resistance. The EPDM latex whose average dispersed rubber particle diameter deviated from the range specified by this invention (Comparative Experiment 4) formed a molded product which was deficient in shock resistance and gloss.

The styrene-grafted EPDM which used a thermal initiation type potassium persulfate instead of a redox type as an initiator (Comparative Experiment 3) formed a molded product which was deficient in shock resistance, gloss, and chemical resistance.

The latexes of comparative Experiments 5, 6, 7, and 10 which severally lacked any of the essential components (a) to (c) of this invention formed molded products inferior in shock resistance, gloss, and chemical resistance to the molded product of Example 3. The molded product of Example 3 showed an outstanding effect in improving minimum injection molding pressure (SSP) and chemical resistance as compared with the molded product of Comparative Experiment 7 in particular. This prominent effect surpassed the expectations entertained before the experiment. In Comparative Experiment 7, the test piece formed slivers on the surface in consequence of the test for chemical resistance and showed a high absorbency for the chemical used in the test. In contrast in Example 3, the test piece assumed a slightly coarsened surface during this test and showed a low absorbency for the chemical.

The latexes of Examples 2 to 4 and those of Comparative Experiments 8 and 9 were different in the amount of acid-modified wax added. When the latexes contained acid-modified waxes in amounts falling within the range specified by this invention as in Examples 2 to 4 showed no adverse effect on physical properties. When no acid-modified wax was used (Comparative Experiment 8), the molded product was deficient in gloss. When the latex contained an acid-modified latex in an unduly large amount (Comparative Experiment 9), the molded product was deficient in heatproofness and in shock resistance and other mechanical properties as well.

Further, the latex which incorporated an ordinary wax (Comparative Experiment 11) in the place of the acid-modified wax of Example 3 was slightly deficient in gloss and chemical resistance and conspicuously deficient in shock resistance.

TABLE 2

| Example | Example of invention | | | | | Comparative Experiment | | | | | | | | | | |
|---|---|---|---|---|---|---|---|---|---|---|---|---|---|---|---|---|
|  | 1 | 2 | 3 | 4 | 5 | 1 | 2 | 3 | 4 | 5 | 6 | 7 | 8 | 9 | 10 | 11 |
| Composition (part) | | | | | | | | | | | | | | | | |
| Emulsion EPDM latex No. | A | B | B | B | C | E | D | B | F | | | | B | B | | B |
| ST- Initiator | | | Redox | | | | | PPS | Redox | | | | Redox | | | Redox |
| EPDM Proportion (part) | 25 | 25 | 25 | 25 | 25 | 25 | 25 | 25 | 25 | | | | 25 | 25 | | 25 |
| Bulk ST-EPDM | | | | | | | | | | 70 | | | | | | |
| Solution ST-EPDM | | | | | | | | | | | 70 | | | | | |
| Emulsion ST-PBDE | | | | | | | | | | | | 25 | | | | |
| Polystyrene | 45 | 45 | 45 | 45 | 45 | 45 | 45 | 45 | 45 | | | 45 | 45 | 45 | | 45 |
| High-impact polystyrene | | | | | | | | | | | | | | | 70 | |
| Polyphenylene ether | 30 | 30 | 30 | 30 | 30 | 30 | 30 | 30 | 30 | 30 | 30 | 30 | 30 | 30 | 30 | 30 |
| Acid-modified wax | 5 | 1 | 5 | 10 | 5 | 5 | 5 | 5 | 5 | 5 | 5 | 5 | | 15 | 5 | |
| Ordinary wax | | | | | | | | | | | | | | | | 5 |
| Properties | | | | | | | | | | | | | | | | |
| SSP (kg/cm²) | 47 | 53 | 48 | 42 | 45 | 47 | 49 | 58 | 41 | 47 | 48 | 58 | 55 | 40 | 45 | 47 |
| Izod Imp (kg · cm/cm) | 30 | 34 | 35 | 29 | 29 | 18 | 23 | 16 | 19 | 12 | 14 | 19 | 36 | 25 | 11 | 17 |
| HDT (°C.) | 108 | 109 | 109 | 106 | 109 | 108 | 109 | 108 | 108 | 102 | 100 | 104 | 110 | 102 | 100 | 107 |
| Tensile strength (kg/cm²) | 401 | 409 | 416 | 411 | 403 | 312 | 420 | 320 | 375 | 352 | 343 | 411 | 408 | 378 | 327 | 408 |
| Flexural strength (kg/cm²) | 598 | 615 | 612 | 609 | 587 | 487 | 608 | 501 | 497 | 512 | 509 | 625 | 612 | 567 | 565 | 611 |
| Gloss (%) | 88 | 80 | 90 | 87 | 82 | 57 | 91 | 67 | 65 | 59 | 62 | 70 | 70 | 69 | 47 | 82 |
| Resistance to chemicals (appearance) | ○ | ○ | ○ | ○ | ○ | △ | ○ | △ | ○ | △ | △ | XX | ○ | ○ | X | ○ |
| Resistance to chemicals (absorption index) (%) | 11.5 | 12.0 | 11.7 | 11.3 | 10.2 | 26.7 | 11.2 | 27.2 | 12.1 | 28.0 | 30.1 | 94.8 | 12.4 | 11.9 | 39.2 | 18.2 |

What is claimed is:

1. A polyphenylene ether composition, comprising 100 parts by weight of a mixture of the following components (a) and (b) and from 0.1 to 10.0 parts by weight of an acid-modified wax (c)
   (a) polyphenylene ether or the combination of polyphenylene ether and an aromatic vinyl polymer and
   (b) a graft copolymer obtained by emulsion polymerizing 20 to 90 parts by weight of an aromatic vinyl compound to 10 to 80 parts by weight, which is reduced to rubber content, of an ethylene-propylene-non-conjugate diene copolymer rubber latex having a gel content of from 40 to 95% by weight and an average dispersed rubber particle diameter of from 0.2 to 1.0 μm by the use of a redox initiator composed of cumene hydroperoxide, ferrous sulfate, sodium pyrophosphate, and dextrose.

2. A composition according to claim 1, wherein said polyphenylene ether is a polymer or copolymer of the structural unit represented by the following general formula [I]:

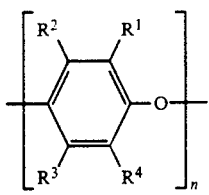

wherein n is an integer of not less than 50 and $R^1$, $R^2$, $R^3$, and $R^4$ are independently one member selected from the group consisting of hydrogen atom, halogen atoms, hydrocarbon groups or substituted hydrocarbon groups, and hydrocarbon oxy groups or substituted hydrocarbon oxy groups.

3. A composition according to claim 1, wherein said aromatic vinyl polymer is a polymer containing not less than 50% by weight of an aromatic vinyl monomer represented by the following general formula [III]:

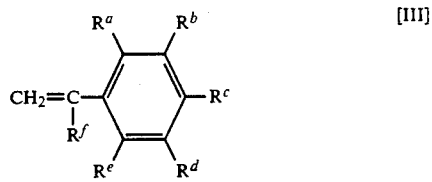

wherein $R^a$, $R^b$, $R^c$, $R^d$ and $R^e$ are independently one member selected from the group consisting of hydrogen atom, halogen atoms, hydrocarbon groups or substituted hydrocarbon groups, and hydrocarbon oxy groups or substituted hydrocarbon oxy groups and $R^f$ is a lower alkyl group of 1 to 4 carbon atoms.

4. A composition according to claim 1, wherein the gravimetric ratio of ethylene and propylene contents of said ethylene-propylene-nonconjugate diene copolymer rubber is in the range of 85 : 15 to 30 : 70.

5. A composition according to claim 1, wherein said aromatic vinyl compound is styrene or α-methyl styrene.

6. A composition according to claim 1, wherein said acid-modified wax is a saturated hydrocarbon wax containing a COOH group and/or an acid anhydride.

7. A composition according to claim 1, wherein the ratio of said component (a) to said component (b) is such that the proportion of said component (b) is in the range of 5 to 100 parts by weight, based on 100 parts by weight of said component (a).

* * * * *